(12) United States Patent
Tadokoro et al.

(10) Patent No.: US 7,119,790 B2
(45) Date of Patent: Oct. 10, 2006

(54) DISPLAY APPARATUS

(75) Inventors: Hiroyuki Tadokoro, Tokyo (JP); Masami Maesaka, Tokyo (JP)

(73) Assignee: Clarion Co., Ltd., Tokyo (JP)

( * ) Notice: Subject to any disclaimer, the term of this patent is extended or adjusted under 35 U.S.C. 154(b) by 467 days.

(21) Appl. No.: 10/603,601

(22) Filed: Jun. 26, 2003

(65) Prior Publication Data

US 2004/0008196 A1 Jan. 15, 2004

(30) Foreign Application Priority Data

Jun. 28, 2002 (JP) .......................... P2002-191449

(51) Int. Cl.
G09G 5/00 (2006.01)
(52) U.S. Cl. ..................... 345/156; 361/681
(58) Field of Classification Search ................ 345/156; 361/681–683
See application file for complete search history.

(56) References Cited

U.S. PATENT DOCUMENTS

| | | | | |
|---|---|---|---|---|
| 5,637,928 A | * | 6/1997 | Nakajima et al. ......... | 307/10.2 |
| 5,805,415 A | * | 9/1998 | Tran et al. ................. | 361/681 |
| 6,140,934 A | * | 10/2000 | Lam ....................... | 340/815.4 |
| 6,268,997 B1 | * | 7/2001 | Hong ....................... | 361/681 |
| 6,411,502 B1 | * | 6/2002 | Burrell .................... | 361/681 |
| 6,816,366 B1 | * | 11/2004 | Ko .......................... | 361/683 |
| 2002/0032048 A1 | * | 3/2002 | Kitao et al. ............... | 455/569 |

FOREIGN PATENT DOCUMENTS

JP 2601300 9/1999

* cited by examiner

*Primary Examiner*—Ricardo Osorio
(74) *Attorney, Agent, or Firm*—McGinn IP Law Group, PLLC (57) ABSTRACT

When an operation panel is detached from a main unit in a state where a display unit is projected from the main unit, the controller controls to accommodate the display unit into the main unit. When the operation panel is attached to the main unit in a state where the display unit is accommodated in the main unit, the controller controls to project the display unit from the main unit.

16 Claims, 6 Drawing Sheets

DISPLAY APPARATUS

BACKGROUND OF THE INVENTION

1. Field of the Invention

The present invention relates to a display apparatus having a movable display unit mounted to a main unit, and more particularly to a display apparatus suitable for a vehicle appliance. The present invention also relates to a controller for controlling operations of the display apparatus.

2. Description of the Related Art

Conventionally, a display unit including a thin liquid crystal display device is mounted on a vehicle information apparatus such as a vehicle television set or a vehicle navigation apparatus. The display unit is usually mounted so as to be slidable with respect to a main unit of the vehicle information apparatus. The display unit is accommodated in the main unit in a dashboard when the display unit is not used, and is projected from the main unit only when in use. By employing such a movable display unit, it becomes possible to effectively use a spatially restricted cabin space of a vehicle. As disclosed in a Japanese Utility Model Registration No. 2,601,300, a technique has been proposed in which, when the display unit is accommodated, setting the display unit into an unpowered mode in which a power supply is turned off, or a sleep mode in which only minimum sections of the main unit are powered is set, and when the display unit is projected, setting the display unit into a regular powered mode. In such conventional vehicle information apparatus, when the display unit is not used, an operation mode is automatically switched into the unpowered mode or the sleep mode so that an advantage of power saving can be attained. When the display unit is to be used, the operation mode is automatically switched into the regular powered mode without any operation to change the operation mode by a user, and hence the operability can be improved.

Recently, the vehicle information apparatus tends to become more high-graded, and therefore, the vehicle information apparatus needs to be provided with an antitheft feature. For example, a system has been proposed in which an operation panel is detachably attached to the main unit or the display unit of the vehicle information apparatus. In the system, when the user is to leave the vehicle, the user detaches the operation panel from the main unit or the display unit, and carries therewith, thereby causing the vehicle information apparatus to be inoperable. As a result, the information apparatus can be prevented from being thieved.

However, in the case where the vehicle information apparatus has the display unit, and the display unit is seen from outside of the vehicle, it is obvious at a glance that an expensive vehicle information apparatus is mounted on the vehicle, and hence the vehicle information apparatus may become an target of theft. Therefore, in such a conventional vehicle information apparatus, an operation of accommodating the display unit must be performed in addition to the detaching of the operation panel. The operation often seems cumbersome to the user. As a result, the operation of accommodating the display unit is often neglected, thereby causing the possibility that an advantage of suppressing theft is not sufficiently exerted. Specifically, in a case where a switch for controlling the operation of the display unit is disposed on the operation panel, when the operation panel is once detached, the operation panel must be then again attached only for the sake of accommodating the display unit. Such an additional operation is very cumbersome to the user. Alternatively, the switch for controlling the operation of the display unit may be disposed on the main unit separately from the operation panel. In the alternative, the detaching of the operation panel and the operation of accommodating the display unit can be independently performed, but the operation still seems cumbersome to the user, and an improvement of an ease of use has been requested.

SUMMARY OF THE INVENTION

It is an object of the invention to provide a display apparatus in which an operation of accommodating or projecting a display unit is performed in accordance with an operation of detaching or attaching an operation panel, thereby preventing the operation of accommodating the display unit from being neglected when the operation panel is detached, and which can therefore exert high operability and an excellent advantage of preventing to be thieved.

In order to achieve the above object, according to a first aspect of the invention, there is provided a display apparatus including: a main unit; a display unit mounted to the main unit so as to be accommodatable and projectable in and from the main unit; an operation panel detachably attached to the main unit or to the display unit; and a controller adapted to control operations of accommodating and projecting the display unit in and from the main unit, wherein when the operation panel is detached from the main unit or the display unit in a state where the display unit is projected from the main unit, the controller controls to accommodate the display unit into the main unit.

According to a ninth aspect of the invention, there is provided a controller for controlling operations of a display apparatus having a main unit, a display unit mounted to the main unit so as to be accommodatable and projectable in and from the main unit, and an operation panel detachably attached to the main unit or to the display unit, the controller including: a display control part adapted to control the display unit to accommodate into the main unit when the operation panel is detached from the main unit or the display unit in a state where the display unit is projected from the main unit.

According to the first and the ninth aspect of the invention, the display unit can be automatically accommodated into the main unit, simply by detaching the operation panel from the main unit or the display unit. Therefore, the operation of accommodating the display unit can be prevented from being neglected, and operations to be performed by a user can be reduced. In a state where the operation panel is detached, the display unit is always accommodated. Therefore, the apparatus is suitable for a vehicle appliance in which theft is suppressed by accommodation of the display unit.

In order to achieve the above object, according to a fifth aspect of the invention, there is provided a display apparatus including: a main unit; a display unit mounted to the main unit so as to be accommodatable and projectable in and from the main unit; an operation panel detachably attached to the main unit or to the display unit; and a controller adapted to control operations of accommodating and projecting the display unit in and from the main unit, wherein when the operation panel is attached to the main unit or the display unit in a state where the display unit is accommodated in the main unit, the controller controls to project the display unit from the main unit.

According to a thirteenth aspect of the invention, there is provided a controller for controlling operations of a display apparatus having a main unit, a display unit mounted to the main unit so as to be accommodatable and projectable in and from the main unit, and an operation panel detachably attached to the main unit or to the display unit, the controller including: a display control part adapted to control the display unit to project from the main unit when the operation panel is attached to the main unit or the display unit in a state where the display unit is accommodated from the main unit.

According to the fifth and the thirteenth aspect of the invention, when the operation panel is attached to the main unit or the display unit, the display unit can be automatically projected from the main unit. Therefore, the display unit can be immediately used, and satisfactory ease of use is attained.

BRIEF DESCRIPTION OF THE DRAWINGS

The above objects and advantages of the present invention will become more apparent by describing preferred exemplary embodiments thereof in detail with reference to the accompanying drawings, wherein.

DETAILED DESCRIPTION OF THE PREFERRED EMBODIMENTS

Hereinafter, prior to describing preferred embodiments of the invention, various aspects of the invention will be described.

According to a first aspect of the invention, there is provided a display apparatus including: a main unit; a display unit mounted to the main unit so as to be accommodatable and projectable in and from the main unit; an operation panel detachably attached to the main unit or to the display unit; and a controller adapted to control operations of accommodating and projecting the display unit in and from the main unit, wherein when the operation panel is detached from the main unit or the display unit in a state where the display unit is projected from the main unit, the controller controls to accommodate the display unit into the main unit.

According to a ninth aspect of the invention, there is provided a controller for controlling operations of a display apparatus having a main unit, a display unit mounted to the main unit so as to be accommodatable and projectable in and from the main unit, and an operation panel detachably attached to the main unit or to the display unit, the controller including: a display control part adapted to control the display unit to accommodate into the main unit when the operation panel is detached from the main unit or the display unit in a state where the display unit is projected from the main unit.

According to the first and the ninth aspect of the invention, the display unit can be automatically accommodated in the main unit, simply by detaching the operation panel from the main unit or the display unit. Therefore, the operation of accommodating the display unit can be prevented from being neglected, and operations to be performed by the user can be reduced. In a state where the operation panel is detached, the display unit is always accommodated. Therefore, the apparatus is suitable for a vehicle appliance in which theft is suppressed by accommodation of the display unit.

According to a second aspect of the invention, in addition to the first aspect of the invention, the controller switches the main unit into an unpowered mode in which a power supply to the main unit is interrupted or into a sleep mode in which only minimum sections of the main unit are powered, after the display unit is accommodated within the main unit.

According to a tenth aspect of the invention, in addition to the ninth aspect of the invention, the controller further comprises a power control part adapted to switch the main unit into an unpowered mode in which a power supply to the main unit is interrupted or into a sleep mode in which only minimum sections of the main unit are powered, after the display unit is accommodated within the main unit.

According to the second and the tenth aspect of the invention, after the display unit is accommodated in the main unit, the main unit is switched into the unpowered mode or the sleep mode. Therefore, it is expected to attain the effect of power saving.

According to a third aspect of the invention, in addition to the first aspect of the invention, the controller controls to accommodate the display unit into the main unit when a predetermined time period elapses after the operation panel is detached from the main unit or the display unit.

According to an eleventh aspect of the invention, in addition to the ninth aspect of the invention, the display control part controls to accommodate the display unit into the main unit when a predetermined time period elapses after the operation panel is detached from the main unit or the display unit.

According to the third and the eleventh aspect of the invention, when the predetermined time period elapses after the operation panel is detached from the main unit or the display unit, the display unit is accommodated in the main unit. Consequently, the operation of detaching the operation panel, and that of accommodating the display unit are not simultaneously performed. Therefore, even in a layout in which an accommodation slot for the display unit is in vicinity of the operation panel, fingers of a user grasping the operation panel are prevented from being bitten by the display unit, which is being accommodated. As a result, the operation of detaching the operation panel can be performed safely and surely.

According to a fourth aspect of the invention, in addition to the first aspect of the invention, the apparatus further includes an alarm sound outputting section adapted to output an alarm sound when the display unit is accommodated into the main unit.

According to a twelfth aspect of the invention, in addition to the ninth aspect of the invention, the controller further comprises an alarm sound outputting part adapted to control the main unit to output an alarm sound when the display unit is accommodated into the main unit.

According to the fourth and the twelfth aspect of the invention, when the operation of accommodating or projecting the display unit is to be performed, an alarm sound is output. Therefore, an attention of a user can be drawn to the operation, so that the fingers are prevented from being bitten or hit by the display unit.

According to a fifth aspect of the invention, there is provided a display apparatus including: a main unit; a display unit mounted to the main unit so as to be accommodatable and projectable in and from the main unit; an operation panel detachably attached to the main unit or to the display unit; and a controller adapted to control operations of accommodating and projecting the display unit in and from the main unit, wherein when the operation panel is attached to the main unit or the display unit in a state where the display unit is accommodated in the main unit, the controller controls to project the display unit from the main unit.

According to a thirteenth aspect of the invention, there is provided a controller for controlling operations of a display apparatus having a main unit, a display unit mounted to the main unit so as to be accommodatable and projectable in and from the main unit, and an operation panel detachably attached to the main unit or to the display unit, the controller including: a display control part adapted to control the display unit to project from the main unit when the operation panel is attached to the main unit or the display unit in a state where the display unit is accommodated from the main unit.

According to the fifth and the thirteenth aspect of the invention, when the operation panel is attached to the main unit or the display unit, the display unit can be automatically projected from the main unit. Therefore, the display unit can be immediately used, and satisfactory ease of use is attained.

According to a sixth aspect of the invention, in addition to the fifth aspect of the invention, the controller controls to project the display unit to a position where the display unit is positioned before the display unit is accommodated in the main unit.

According to a fourteenth aspect of the invention, in addition to the thirteenth aspect of the invention, the display control part controls to project the display unit to a position where the display unit is positioned before the display unit is accommodated in the main unit.

According to the sixth and the fourteenth aspect of the invention, when the accommodated display unit is to be used, the display unit can be return to the former position. Therefore, a state where the user can easily use the appliance can be maintained.

According to a seventh aspect of the invention, in addition to the fifth aspect of the invention, when a state before the operation panel is attached to the main unit or the display unit is an unpowered mode in which a power supply to the main unit is interrupted or a sleep mode in which only minimum sections of the main unit are powered, the controller switches the main unit into a regular powered mode after projecting the display unit.

According to a fifteenth aspect of the invention, in addition to the thirteenth aspect of the invention, the controller further comprising a power control part adapted to switch the main unit into a regular powered mode after projecting the display unit when a state before the operation panel is attached to the main unit or the display unit is an unpowered mode in which a power supply to the main unit is interrupted or a sleep mode in which only minimum sections of the main unit are powered.

According to the seventh and the fifteenth aspect of the invention, in a case where the state before the operation panel is attached to the main unit or the display unit is the unpowered mode or the sleep mode, the main unit is switched into the regular powered mode can be set after the display unit is projected from the main unit. Therefore, the user can omit the operation of switching the main unit into the powered mode, and hence the operability is improved.

According to an eighth aspect of the invention, in addition to the fifth aspect of the invention, the main unit further includes an alarm sound outputting section adapted to output an alarm sound when the display unit is projected from the main unit.

According to a sixteenth aspect of the invention, in addition to the thirteenth aspect of the invention, the controller further comprises an alarm sound outputting part adapted to control the main unit to output an alarm sound when the display unit is accommodated into the main unit.

According to the eighth and the sixteenth aspect of the invention, when the operation of accommodating or projecting the display unit is to be performed, an alarm sound is output. Therefore, the attention of the user can be drawn to the operation, so that the fingers are prevented from being bitten or hit by the display unit.

Referring now to the accompanying drawings, a description will be given in detail of preferred embodiments of the invention.

Figure 7:
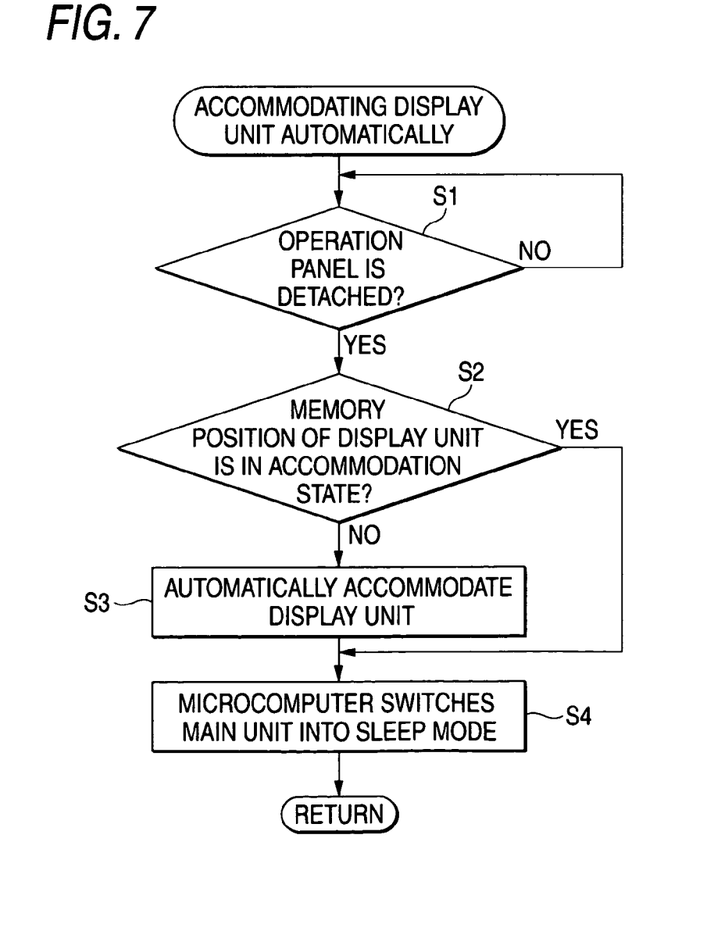
FIG. 7 is a flowchart illustrating an automatic accommodating operation in the first embodiment.
Figure 8:
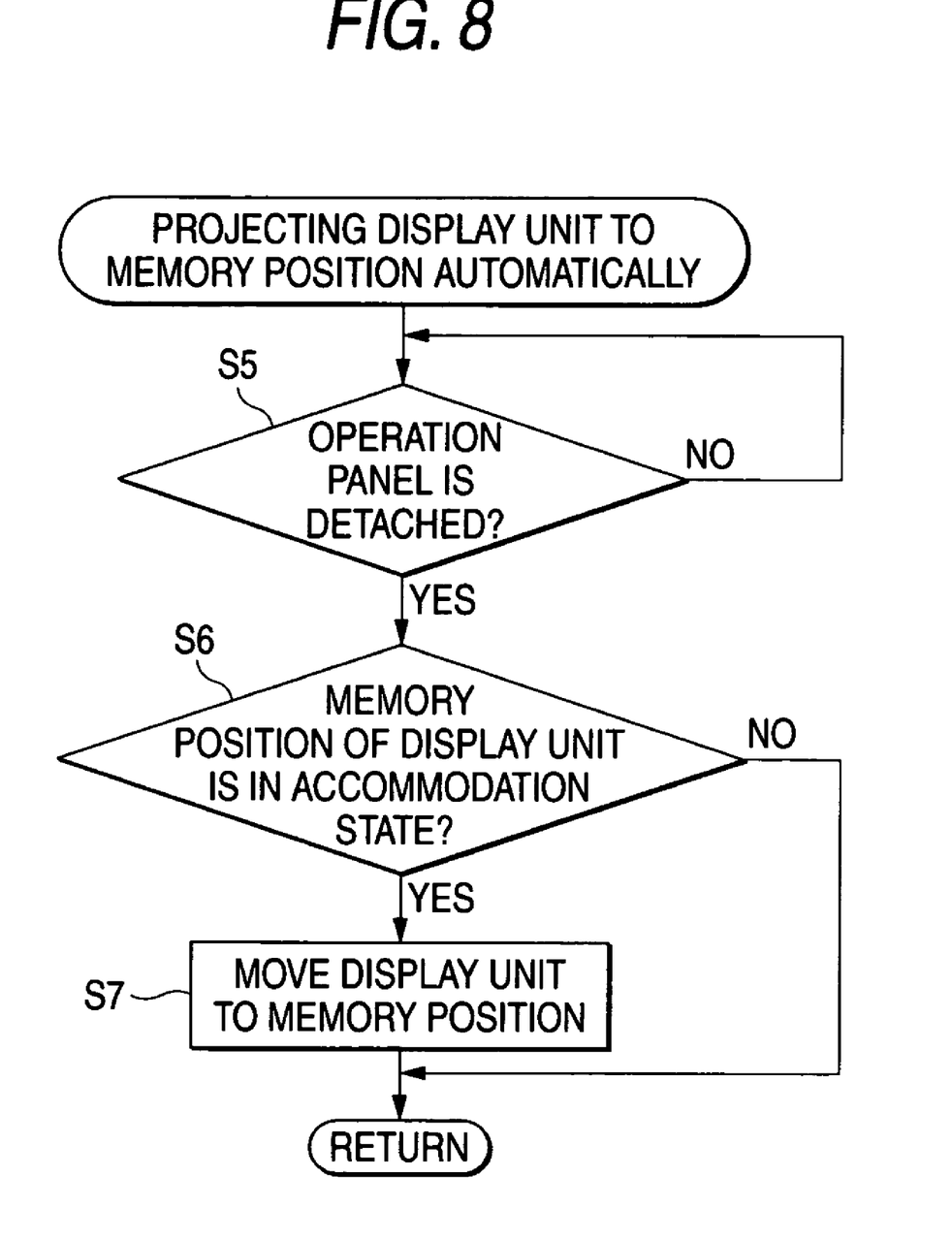
FIG. 8 is a flowchart illustrating an automatic projecting operation in the first embodiment.
Figure 9:
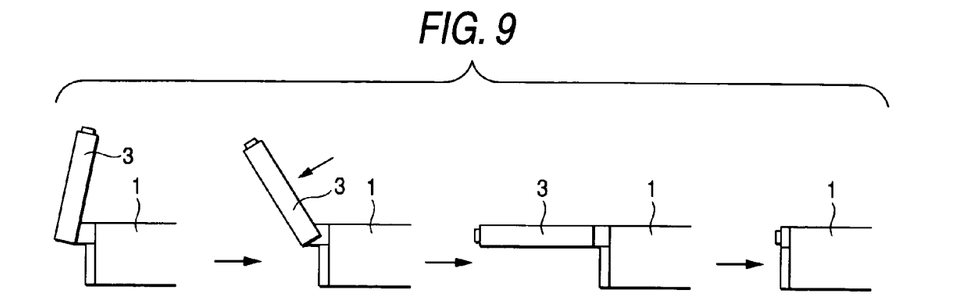
FIG. 9 is a side view illustrating an operation in the first embodiment.
Figure 10:
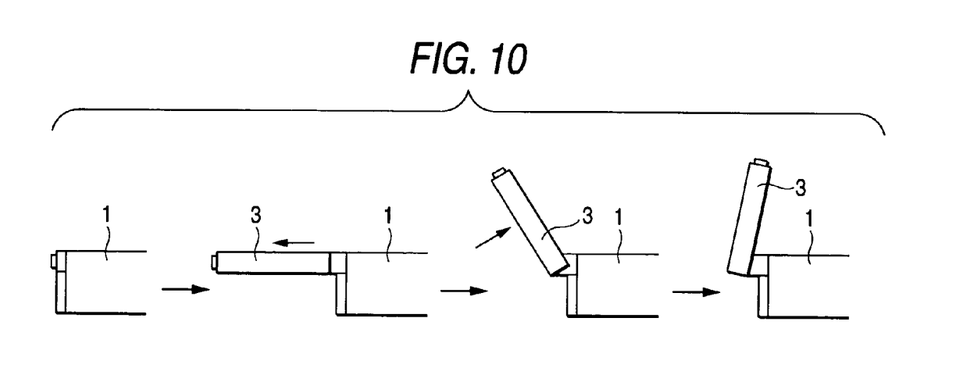
FIG. 10 is a side view illustrating an operation in the first embodiment.

Hereinafter, a display apparatus of a first embodiment of the invention will be specifically described with reference to the accompanying drawings. The display apparatus of the first embodiment embraces the first, second, fourth, fifth, sixth, eighth, ninth, tenth, twelfth, thirteenth, fourteenth and sixteenth aspect of the invention, which are described above. FIGS. 1 through 5 are perspective views of the display apparatus, FIG. 6 is a circuit diagram of the display apparatus, FIGS. 7 and 8 are flowcharts of an operation of the display apparatus, and FIGS. 9 and 10 are side views illustrating the operation of the display apparatus.

As shown in FIGS. 1 through 5, an operation panel 2 is detachably attached to a main unit 1, and a display unit 3, which is accommodatable in and projectable from the main unit 1, is mounted to the main unit 1. The operation panel 2 has a plurality of buttons 2a arranged on a face thereof directs to a front side when attached to the main unit 1. An eject button 10 for detaching the operation panel 2 is disposed on the main unit 1.

The display unit 3 is disposed so as to be horizontally slidable between an accommodated position inside the main unit 1 and an projected position outside the main unit 1. The display unit 3 is supported so as to be rotatable at an inner side edge portion from a horizontal state to a substantially vertical state when at the projected position. The display unit 3 can be stopped at any given position of a projection amount and an angle of rotation. A predetermined position is stored as a memorized position in a microcomputer 5, which will be described later. The display unit 3 has a display screen 3a is formed thereon. The display screen 3a is downward directed when the display unit 3 is in the horizontal state, and directed so as to be opposed to the operator when the display unit 3 is in the vertical state. When the whole display unit 3 is in the accommodation position, a front face portion 3b thereof, which directs to a front face, is placed so as to be in plane with a front face of the main unit 1 and the display unit 3. An open/close button 4 for activating an operation of accommodating or projecting of the display unit 3 is placed on the front face portion 3b of the display unit 3.

Figure 1:
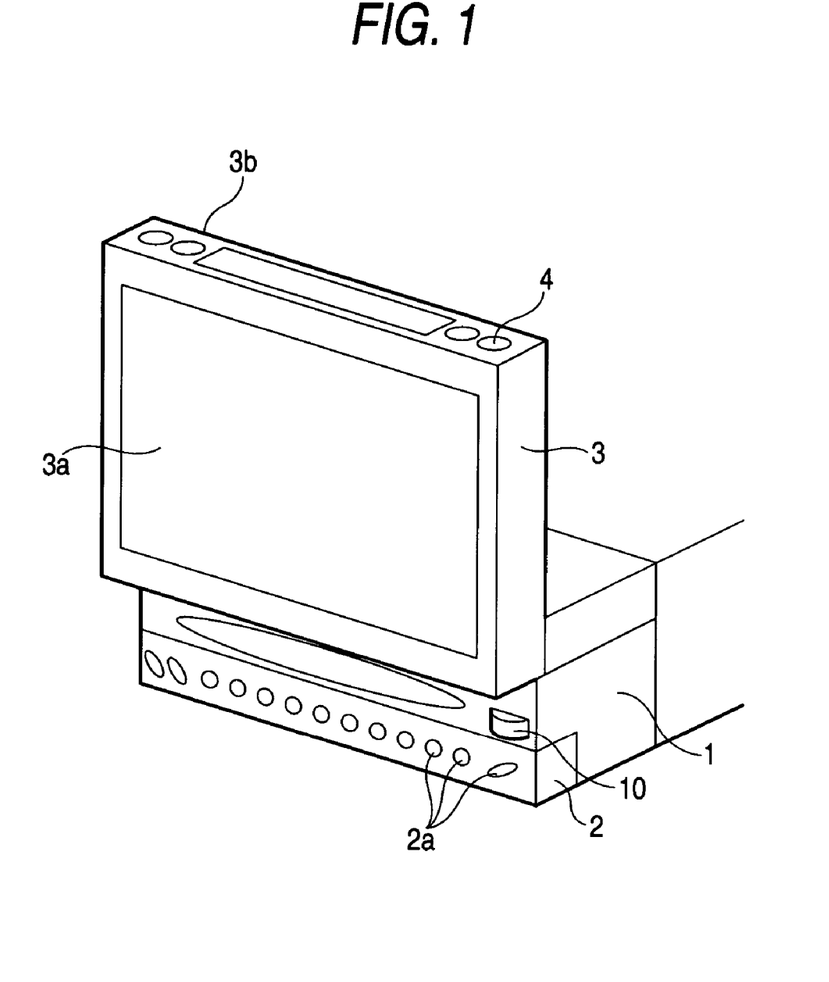
FIG. 1 is a perspective view of a first embodiment of the invention.
Figure 2:
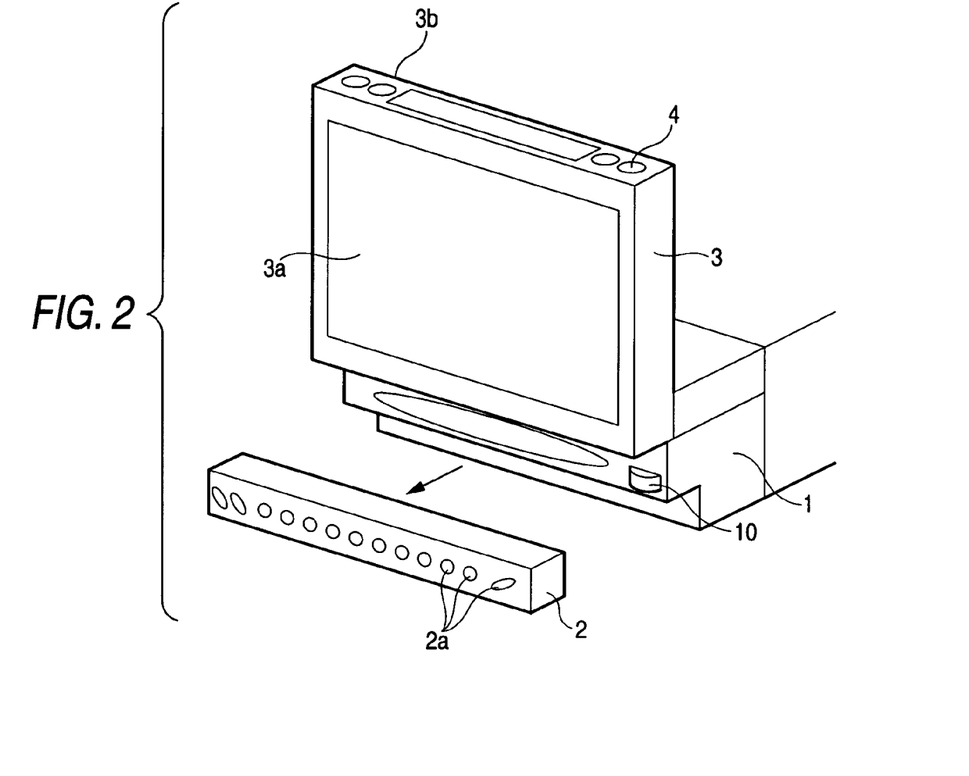
FIG. 2 is a perspective view of the first embodiment.
Figure 3:
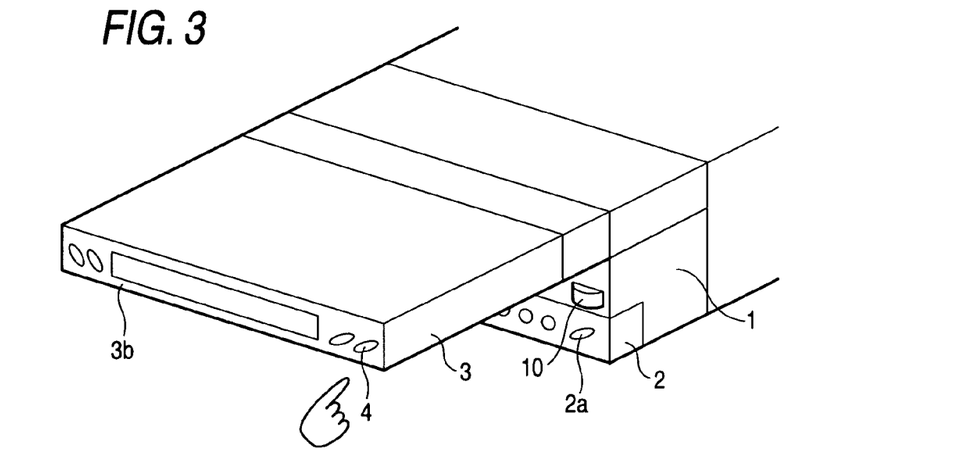
FIG. 3 is a perspective view of the first embodiment.
Figure 4:
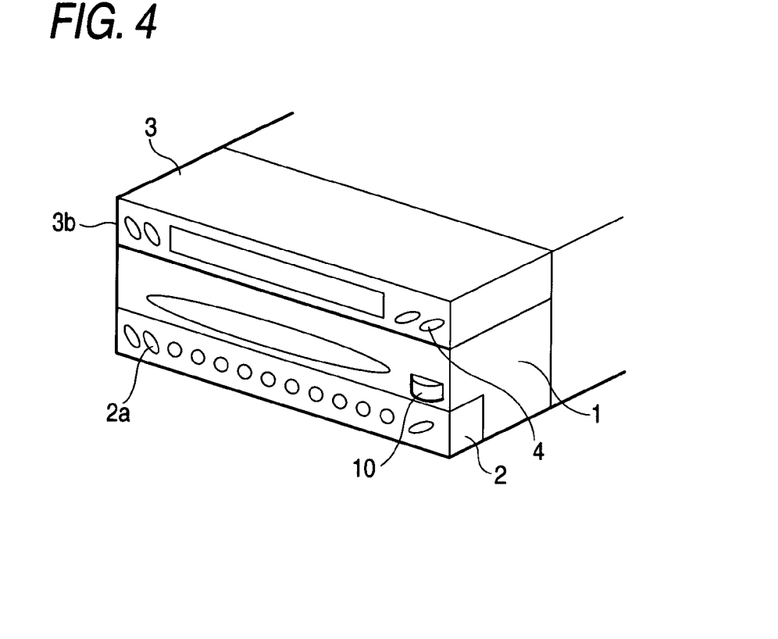
FIG. 4 is a perspective view of the first embodiment.
Figure 5:
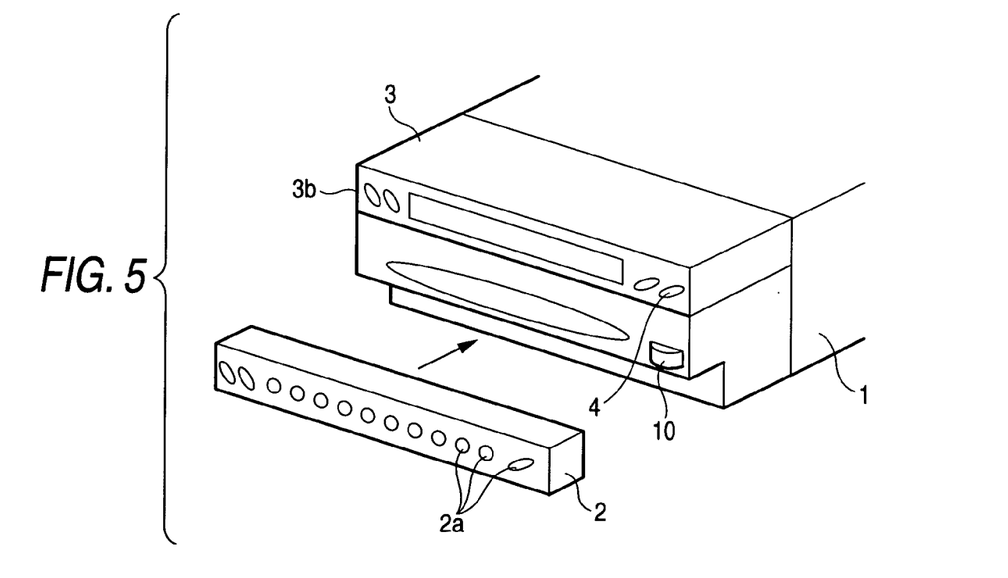
FIG. 5 is a perspective view of the first embodiment.
Figure 6:
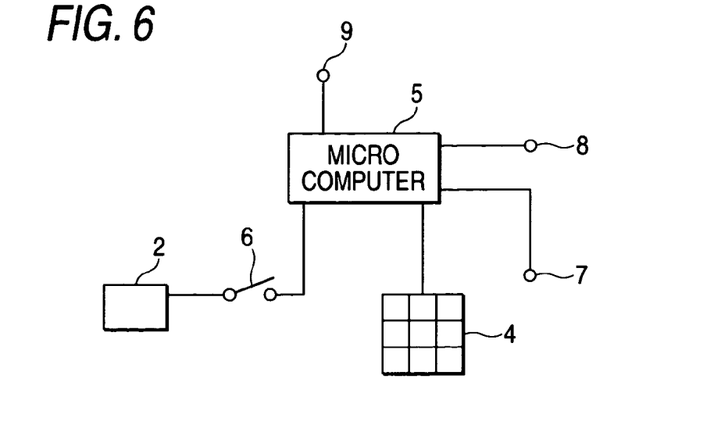
FIG. 6 is a circuit diagram of the first embodiment.

As shown in FIG. 6, the open/close button 4 is connected to the microcomputer (controller) 5, which is mounted into the main unit 1. The microcomputer 5 controls the operations of accommodating and projecting the display unit 3. The microcomputer 5 is also connected to an operation panel detecting switch 6 which detects an attachment or an detachment of the operation panel 2, an detecting sensor 7 which detects the position and the angle of rotation of the display unit 3, a driving motor 8 which drives the display unit 3 to slide in the horizontal direction, and an alarm sound outputting section 9 which outputs an alarm sound. The microcomputer 5 has a plurality of processing parts. Each processing parts are adapted to process a controlling of each units and sections of the display apparatus. The processing parts can be structured within the microcomputer 5 as a semiconductor circuit, or can be configured as a software program that runs on the microcomputer 5.

Hereinafter, an operation of automatically accommodating and projecting the display unit 3 in the first embodiment will be described with reference to FIGS. 7 through 10. The operation of automatically accommodating the display unit 3 will be described referring to a flowchart of FIG. 7. When the operation panel 2 is detached by pressing the eject button 10, the detachment of the operation panel 2 is detected by the microcomputer 5 based on a signal input from the operation panel detecting switch 6 (step S1). When the detachment of the operation panel is detected, the microcomputer 5 determines that whether the display unit 3 is in an accommodated state or not according to an input signal from the detecting sensor 7 (step S2). When the display unit 3 is not in the accommodated state, the microcomputer 5 operates the driving motor 8 to accommodate the display unit (step S3). The display unit 3 is accommodated into the main unit 1 in a manner as shown in FIG. 9. The accommodating operation described above proceeds in the sequence of FIG. 1, FIG. 2, FIG. 3, and FIG. 4. After the display unit 3 is accommodated, or in a case where the display unit 3 is in the accommodated state when the operation panel 2 is detached, the microcomputer 5 switches the main unit 1 into a sleep mode, in which only minimum sections are powered (step S4).

In the operation of automatically projecting the display unit 3, as shown in the flowchart of FIG. 8, the microcomputer 5 detects the attachment of the operation panel 3 based on a signal input from the operation panel detecting switch 6 (step S5). When the attachment of the operation panel 2 is detected, the microcomputer 5 determines that whether the display unit 3 is in the accommodated state or not according to an input signal from the detecting sensor 7 (step S6). When the display unit 3 is in the accommodated state, the microcomputer 5 operates the driving motor 8 to project the display unit 3. When the detecting sensor 7 detects that the display unit 3 is rotated to the memorized position, the microcomputer 5 stops projecting the display unit 3 (step S7). The display unit 3 is projected from the main unit 1 in a manner as shown in FIG. 10. The projecting operation described above proceeds in the sequence of FIG. 5, FIG. 4, FIG. 3, and FIG. 1. Although not shown in the flowcharts, when the operation of accommodating or projecting the display unit 3 is to be performed, an alarm sound is output from the alarm sound outputting section 9.

As described above, in the first embodiment, the display unit 3 is automatically accommodated into the main unit 1, simply by detaching the operation panel 2 from the main unit 1. Therefore, the operation of accommodating the display unit 3 can be prevented from being neglected, and operations to be performed by the user can be reduced. In a state where the operation panel 2 is detached, the display unit 3 is always accommodated. Therefore, an apparatus of the first embodiment is suitable to apply into a vehicle information apparatus in which theft is suppressed by accommodation of the display unit 3.

In the first embodiment, when the operation panel 2 is attached to the main unit 1, the display unit 3 is automatically projected from within the main unit 1 to the memorized position. Therefore, the display unit 3 is immediately returned to a state that the user can easily operate the apparatus so that excellent ease of use is attained. After the display unit 3 is accommodated in the main unit 1, the microcomputer 5 is switched into the sleep mode. Therefore, it is possible to attain the advantage of power saving. In the first embodiment, when the operation of accommodating or projecting the display unit 3 is to be performed, an alarm sound is output. Therefore, an attention of the user can be drawn to the operation so that the user can be cautious not to make fingers being bitten or hit by the display unit 3.

The invention is not limited to the first embodiment described above. The shapes and sizes of the operation panel 2 and the display unit 3, the configurations of the driving motor 8 and the switches can be adequately modified. The operation panel 2 may be attached to and detached from the display unit 3 in place of the main unit 1. A rotating direction of the display unit 3 can be adequately selected. Instead of the above-described rotating operation in which the display unit 3 is raised from the horizontal state, the display unit 3 may be rotated so as to fall from the horizontal state. In a case that the display unit 3 is configured to be rotated so as to fall from the horizontal state, the display screen 3a of the display unit 3 is disposed on a face that is upward directed in the horizontal state.

In a second embodiment corresponding to the third and the eleventh aspect of the invention, the microprocessor 5 may control the display unit 3 to be accommodated in the main unit 1 when a predetermined time period elapses after the operation panel 2 is detached from the main unit 1 or the display unit 3. According to the second embodiment, the operation of detaching the operation panel 2 and the operation of accommodating the display unit 3 are not simultaneously performed. Therefore, even in a layout in which an accommodation slot for the display unit 3 is disposed in the vicinity of the operation panel 2, the fingers of the user grasping the operation panel 2 are prevented from being bitten by the accommodating display unit 3. As a result, the operation of detaching the operation panel 2 can be performed safely and surely.

In a third embodiment corresponding to the seventh and the fifteenth aspect of the invention, in the case where an operation mode of the main unit 1 is in the unpowered mode or the sleep mode before attaching the operation panel 2, the main unit 1 may switched into a regular powered mode by attaching the operation panel 2 and the display unit 3 being projected from the main unit 1. According to the third embodiment, the main unit 1 is switched into the powered mode by simply attaching the operation panel 2. Therefore, the operation can be simplified so that the user does not need to switch the operation mode into the powered mode. Although the invention is suitable for a vehicle appliance, the invention can be applied also to home information apparatuses, which are recently diversified, and can contribute to effective utilization of space to operate the home information apparatuses and can enhance an interior design of the home information apparatuses.

As described above, in the apparatus for controlling a display unit of the invention, the operation of accommodating or projecting the display unit is performed in accordance with the operation of detaching or attaching the operation panel, thereby preventing the operation of accommodating the display unit from being neglected when the operation panel is detached. Therefore, high operability and an excellent advantage of preventing theft can be exerted.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A display apparatus comprising:
a main unit;
a display unit translatably mounted with respect to the main unit;
an operation panel detachably attached to the main unit or to the display unit; and
a controller adapted to control a translation of the display unit with respect to the main unit,
wherein, when the operation panel is detached from the main unit or the display unit in a state where the display unit is projected from the main unit, the controller controls a translation of the display unit so as to accommodate the display unit into the main unit.

2. The apparatus as claimed in claim 1, wherein the controller switches the main unit into an unpowered mode in which a power supply to the main unit is interrupted or into a sleep mode in which only minimum sections of the main unit are powered, after the display unit is accommodated within the main unit.

3. The apparatus as claimed in claim 1, wherein the controller controls the translation of the display to accommodate the display unit into the main unit when a predetermined time period elapses after the operation panel is detached from the main unit or the display unit.

4. The apparatus as claimed in claim 1, further comprising an alarm sound outputting section adapted to output an alarm sound when the display unit is accommodated into the main unit.

5. A display apparatus comprising:
a main unit;
a display unit translatably mounted to the main unit;
an operation panel detachably attached to the main unit or to the display unit; and
a controller adapted to control a translation of the display unit with respect to the main unit,
wherein, when the operation panel is attached to the main unit or the display unit in a state where the display unit is accommodated in the main unit, the controller controls a translation of the display unit so as to project the display unit from the main unit.

6. The apparatus as claimed in claim 5, wherein the controller controls the translation of the display unit so as to project the display unit to a position where the display unit is positioned before the display unit is accommodated in the main unit.

7. The apparatus as claimed in claim 5, wherein, when a state before the operation panel is attached to the main unit or the display unit is an unpowered mode in which a power supply to the main unit is interrupted or a sleep mode in which only minimum sections of the main unit are powered, the controller switches the main unit into a regular powered mode after projecting the display unit.

8. The apparatus as claimed in claim 5, further comprising an alarm sound outputting section adapted to output an alarm sound when the display unit is projected from the main unit.

9. A controller for controlling operations of a display apparatus having a main unit, a display unit translatably mounted to the main unit, and an operation panel detachably attached to the main unit or to the display unit, the controller comprising:
a display control that controls a translation of the display unit to accommodate the display unit into the main unit when the operation panel is detached from the main unit or the display unit in a state where the display unit is projected from the main unit.

10. The controller as claimed in claim 9, further comprising a power control part adapted to switch the main unit into an unpowered mode in which a power supply to the main unit is interrupted or into a sleep mode in which only minimum sections of the main unit are powered, after the display unit is accommodated within the main unit.

11. The controller as claimed in claim 9, wherein the display control controls the translation of the display unit so as to accommodate the display unit into the main unit when a predetermined time period elapses after the operation panel is detached from the main unit or the display unit.

12. The controller as claimed in claim 9, further comprising an alarm sound outputting part adapted to control the main unit to output an alarm sound when the display unit is accommodated into the main unit.

13. A controller for controlling operations of a display apparatus having a main unit, a display unit translatably mounted to the main unit, and an operation panel detachably attached to the main unit or to the display unit, the controller comprising:
a display control that controls a translation of the display unit to project from the main unit when the operation panel is attached to the main unit or the display unit in a state where the display unit is accommodated in the main unit.

14. The controller as claimed in claim 13, wherein the display control controls the translation of the display unit to project the display unit to a position where the display unit is positioned before the display unit is accommodated in the main unit.

15. The controller as claimed in claim 13, further comprising a power control part adapted to switch the main unit into a regular powered mode after projecting the display unit when a state before the operation panel is attached to the main unit or the display unit is an unpowered mode in which a power supply to the main unit is interrupted or a sleep mode in which only minimum sections of the main unit are powered.

16. The controller as claimed in claim 13, further comprising an alarm sound outputting part adapted to control the main unit to output an alarm sound when the display unit is accommodated into the main unit.

* * * * *